US010159102B2

(12) United States Patent
Helbert

(10) Patent No.: US 10,159,102 B2
(45) Date of Patent: Dec. 18, 2018

(54) SERVICE DELIVERY THROUGH WIRELESS ACCESS SYSTEMS

(71) Applicant: ALE INTERNATIONAL, Colombes (FR)

(72) Inventor: Emmanuel Helbert, Andlau (FR)

(73) Assignee: ALE INTERNATIONAL, Colombes (FR)

( * ) Notice: Subject to any disclaimer, the term of this patent is extended or adjusted under 35 U.S.C. 154(b) by 0 days.

(21) Appl. No.: 15/370,460

(22) Filed: Dec. 6, 2016

(65) Prior Publication Data

US 2017/0215214 A1 Jul. 27, 2017

Related U.S. Application Data

(63) Continuation of application No. 15/229,481, filed on Aug. 5, 2016, now Pat. No. 9,614,919, which is a continuation of application No. PCT/IB2016/050754, filed on Feb. 12, 2016.

(30) Foreign Application Priority Data

Jan. 26, 2016 (EP) ..................................... 16305072

(51) Int. Cl.
| H04W 76/11 | (2018.01) |
| H04L 29/08 | (2006.01) |
| H04W 76/10 | (2018.01) |
| H04W 48/16 | (2009.01) |
| H04W 84/12 | (2009.01) |
| G06F 3/0482 | (2013.01) |

(Continued)

(52) U.S. Cl.
CPC ........... *H04W 76/11* (2018.02); *H04L 67/141* (2013.01); *H04L 67/16* (2013.01); *H04W 48/16* (2013.01);

(Continued)

(58) Field of Classification Search
CPC ... H04W 76/11; H04W 48/16; H04W 76/021; H04W 84/12; H04W 76/10; H04L 67/141; H04L 67/16; G06F 3/0482

(Continued)

(56) References Cited

U.S. PATENT DOCUMENTS 7,245,603 B1 7/2007 Lucidarme et al.
2003/0061515 A1 3/2003 Kindberg et al.

(Continued)

OTHER PUBLICATIONS

International Search Report and Written Opinion with regard to PCT/IB16/50754 dated May 16, 2016.

*Primary Examiner* — Obaidul Huq
(74) *Attorney, Agent, or Firm* — BCF LLP

(57) ABSTRACT

A communication terminal comprising: a radio interface and a WLAN communication module configured to: generate and send an association request; receive an association response; and establish IP connectivity. The communication terminal also comprises a service selection module configured to select a computer-implemented service to be accessed; and a service execution control module configured to execute software application code implementing the selected computer-implemented service. The WLAN communication module is further configured to: in response to receiving a service selection command from the service selection module, generate an association request comprising a service identifier which identifies the selected service; parse the association response received through the radio interface to detect a link carried in the association response, wherein the link points to a network address of an application server suitable for delivering application data corresponding to the selected computer-implemented service; and initiate data communication with the network address for downloading application data.

8 Claims, 3 Drawing Sheets

(52) U.S. Cl.
CPC ........... *H04W 76/10* (2018.02); *G06F 3/0482* (2013.01); *H04W 84/12* (2013.01)

(58) Field of Classification Search
USPC .................................. 370/310, 328, 338
See application file for complete search history.

(56) References Cited

U.S. PATENT DOCUMENTS

| | | |
|---|---|---|
| 2005/0085229 A1* | 4/2005 | Yamaguchi ............ H04W 4/00 455/432.2 |
| 2005/0155036 A1 | 7/2005 | Tiainen et al. |
| 2007/0077958 A1 | 4/2007 | Kalogeropoulos |
| 2007/0280149 A1* | 12/2007 | Takahashi ............... H04W 8/08 370/328 |
| 2009/0135759 A1 | 5/2009 | Hirano et al. |
| 2010/0023582 A1 | 1/2010 | Pedersen et al. |
| 2011/0116443 A1 | 5/2011 | Yu et al. |
| 2013/0039271 A1 | 2/2013 | De La Garrigue |
| 2013/0084889 A1 | 4/2013 | Schmitt et al. |
| 2013/0182696 A1 | 7/2013 | Yang et al. |
| 2014/0012947 A1 | 1/2014 | Schaller |
| 2014/0047435 A1 | 2/2014 | Urbach |
| 2014/0189077 A1 | 7/2014 | Bauer |
| 2015/0055501 A1 | 2/2015 | Duo et al. |
| 2016/0080096 A1 | 3/2016 | Kim et al. |

\* cited by examiner

SERVICE DELIVERY THROUGH WIRELESS ACCESS SYSTEMS

CROSS-REFERENCE TO RELATED APPLICATION

This United States Patent Application is a continuation of U.S. patent application Ser. No. 15/229,481 filed on Aug. 5, 2016 which is a continuation of International Patent Application PCT/IB2016/050754 filed on Feb. 12, 2016 which claims priority from European Patent Application Serial No. 16305072.7 filed on Jan. 26, 2016, the entire content of which are incorporated herein by reference.

FIELD OF THE INVENTION

The invention relates to the technical field of service delivery through wireless access systems and infrastructures, in particular in accordance with the IEEE 802.11 specification also known as Wi-Fi.

BACKGROUND

Wi-Fi is the dominant technology for Wireless Local Area Networks (WLAN). A wireless communication terminal having an active Internet connection established through a WLAN can generally access all services that the Internet is able to provide. Service as employed herein refers to any computer-implemented service, e.g. information service, entertainment service, booking service, reporting service, monitoring service, payment service, authentication service, communication service and others.

In addition to an active Internet connection, accessing such services generally requires some kind of prior configuration of the communication terminal, e.g. installing a software application that includes some embedded network addresses for communicating with predefined distant servers, or inputting a URL in a web-browser application.

The providing of services through Wi-Fi communication terminals without the need to have an active Internet connection has also been proposed in the art in some rare cases. The publication *Bit-Stuffing in* 802.11 *Beacon Frame: Embedding Non-Standard Custom Information* V. GUPTA et al. in International Journal of Computer Applications, Vol. 63, No 2, February 2013 discloses a location specific advertisement service that relies on advertisements, coupons, discounts and commercial announcements being overloaded in beacon frames of a WLAN access point and therefore broadcasted in the coverage area of the access point. Such advertisement service is inherently limited in purpose and usability.

SUMMARY

Aspects of the invention are based on the idea of offering a broad selection of computer-implemented services through a wireless communication terminal lacking an active Internet connection. Aspects of the invention are based on the idea of offering computer-implemented services through a wireless communication terminal in a way that limits the amount of prior configuration needed at the wireless communication terminal.

Aspects of the invention stem for the observation that situations exist in which it would be desirable to be able to launch a software application on a wireless communication terminal even though the software application is not yet installed and no network connection is yet available.

Such situations are illustrated in the two examples below.

Example 1

A local Wi-Fi network is deployed in a hospital and publicly accessible for visitors' wireless communication terminals to connect to the Internet or to a private network. The hospital administration develops a map assistance software application or web-service to help visitors find their way in the buildings and facilities. A conventional method for accessing such software application or web-service consists in firstly connecting the wireless communication terminal to the Wi-Fi network, secondly scanning a QR code which redirects the web-browser application running on the wireless communication terminal towards the hospital webservers or towards a web-portal from which the application may be downloaded and, thirdly installing and launching the application on the wireless communication terminal. However, it is observed that the user experience would be improved by enabling the user to learn about and select this map assistance service prior to connecting to the Wi-Fi network and to have it launched as soon as the network connectivity is established.

Example 2

A local Wi-Fi network is deployed in an airport and publicly accessible for passengers' wireless communication terminals to connect to the Internet or to a private network. Several software applications related to the airport context are made available through this Wi-Fi network: application for getting the flights time-schedule, application for checking the arrivals, for finding one's way, for booking a taxi, etc. Instead of downloading all these applications once connected to the Wi-Fi network, it would be desirable for an end-user to be able to select one of these applications prior to establishing the Wi-Fi connection and to have it launched as soon as the connection is established.

Accordingly, the invention is based on the idea of enabling an end-user to select an application layer service (i.e. OSI Layer 7) directly from the medium connection layer (OSI network Layer 2). In embodiments, the invention enables to select an application that is not yet installed on a communication terminal prior to any network connection and to automatically launch the application with minimal further actions.

In an embodiment, the invention provides a wireless access system comprising:
A radio interface,
A data repository storing a directory of available services consisting of a set of service records, wherein each service record comprises a service identifier and a network address of an application server suitable for delivering application data corresponding to a computer-implemented service,
A control module configured to:
Parse an association request received through the radio interface to detect a service identifier carried in the association request,
Look up the directory of available services for retrieving a service record matching the detected service identifier,
Generate and send an association response to a source of the association request through the radio interface, wherein the association response comprises a link to the network address found in the matching service record, and
Provide network connectivity between the source of the association request and the application server associated to the network address.

According to embodiments, such a wireless access system can comprise one or more of the features below.

In embodiments, each service record further comprises a service descriptor for describing the service to an end-user and wherein the control module is further configured to:
broadcast beacon signals through the radio interface, wherein the beacon signals include a service advertisement for a or each service record of the directory of available services, wherein the service advertisement comprises the service identifier and the service descriptor found in the service record.

In embodiments, the radio interface is configured to send and receive radio signals in accordance with an IEEE 802.11 specification, wherein the association request, association response and beacon signals are configured in accordance with the IEEE 802.11 specification.

In embodiments, the beacon signal includes the service advertisement in a Vendor Specific field of the beacon signal.

In embodiments, the or each service record further comprises at least one of a traffic requirement of the computer-implemented service, a Quality-of-Service (QoS) requirement of the computer-implemented service, an operating-system (OS) requirement of the computer-implemented service, a version number of the computer-implemented service, a security level of the computer-implemented service and a price of the computer-implemented service. In embodiments, the or each service advertisement further comprises at least one of the traffic requirement, Quality-of-Service requirement, operating-system requirement, version number, security level and price found in the service record.

In embodiments, the control module is further configured to:
record a source IP address and source MAC address found in the association request, and
filter out a subsequent data packet received through the radio interface and intended to the network address of the application server in response to detecting that the data packet does not originate from the recorded source IP address and source MAC address.

In embodiments, the network address of the application server is a FQDN of the application server.

In embodiments, the link to the network address found in the matching service record points to a local address in the wireless access system, wherein the control module is further configured to operate as a reverse-proxy between the application server and the source of the association request.

In embodiments, the application data comprises software application code encoding a web application executable by a web browser. In embodiments, the application data comprises software application code encoding a software application executable by a processor of the communication terminal under the control of an operating system.

In an embodiment, the invention also provides a communication terminal comprising:
a radio interface,
a WLAN communication module configured to:
  generate and send an association request to a wireless access system through the radio interface,
  receive an association response from the wireless access system through the radio interface, and
  establish IP connectivity with the wireless access system,
a service selection module configured to select a computer-implemented service to be accessed, and
a service execution control module configured to execute software application code implementing the selected computer-implemented service,
wherein the WLAN communication module is further configured to:
  in response to receiving a service selection command from the service selection module, generate an association request comprising a service identifier which identifies the selected service, and
  parse the association response received through the radio interface to detect a link carried in the association response, wherein the link points to a network address of an application server suitable for delivering application data corresponding to the selected computer-implemented service, and
  initiate data communication with the network address for downloading the application data.

In an embodiment, the WLAN communication module is further configured to parse beacon signals received through the radio interface, to detect a service advertisement carried in the beacon signals indicative of a service available for selection, and to communicate the service advertisement to the service selection module.

In an embodiment, the service selection module is further configured for generating a graphical user interface for displaying a set of computer-implemented services available for selection.

In an embodiment, the graphical user interface displays a text descriptor for each computer-implemented service available for selection.

In an embodiment, the service selection module is further configured to filter the services available for selection as a function of information carried in the service advertisements and to generate the graphical user interface so as to display the filtered set of computer-implemented services available for selection.

In an embodiment, the information carried in the service advertisements comprises at least one of a traffic requirement of the computer-implemented service, a Quality-of-Service (QoS) requirement of the computer-implemented service, an operating-system requirement of the computer-implemented service, a version number of the computer-implemented service, a security level of the computer-implemented service and a price of the computer-implemented service.

BRIEF DESCRIPTION OF THE DRAWINGS

These and other aspects of the invention will be apparent from and elucidated with reference to the embodiments described hereinafter, by way of example, with reference to the drawings.

DETAILED DESCRIPTION OF THE EMBODIMENTS

Figure 1:
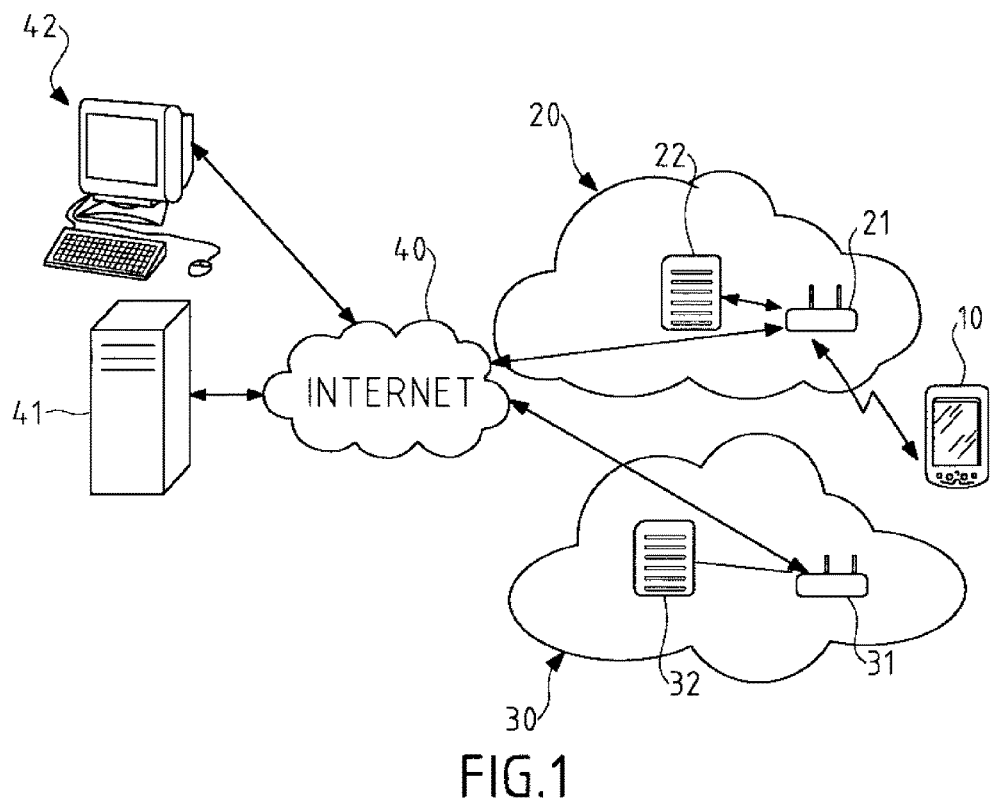
FIG. 1 is a functional representation of a communication system in which the invention can be implemented.

FIG. 1 is a schematic diagram illustrating a communication system which offers the ability to learn about, select and eventually gain access to computer-implemented services made available through a WLAN infrastructure from a communication terminal that initially lacks a network connection.

In the following, the terms "service" and "application" refer to all kinds of tasks based on data processing in a computer environment and providing useful results to an end-user, such as an information service (e.g. phone directory, bus schedule), an entertainment service (e.g. gaming), a booking service, a reporting service, a monitoring service, a payment service, an authentication service, a communication service and others.

A service or application is implemented by means of application data which may include software code in source format or executable format, written in any computer language, e.g. HTML, C++, JAVA, VHDL, Python, ActiveX, etc. Such application data may include functional data, e.g. computer programs, configuration files and functional parameters, and cognitive data, e.g. images, text, maps, videos useful for implementing the service.

Functions which are performed by the communication system include:
- Publishing of applications so that they can be advertised by the WLAN infrastructure. The application publication function makes it possible for application editors or IT administrators to publish applications made available in the WLAN infrastructure.
- Broadcasting of application identities through the WLAN infrastructure so that end-users can select services which they want to launch. The information broadcasting function enables the WLAN infrastructure to advertise the applications that are made available to end-users.
- Selection and launching of applications on the communication terminals. The application selection and launching function enables the end-user or communication terminal to select the application and initiate the network connection and application launching in an integrated manner. In particular, the communication terminal connects to a WLAN infrastructure selected as a function of the application that was selected by the end-user or communication terminal. In addition, the WLAN infrastructure helps the communication device launch the selected application.

For that purpose, the communication system mainly comprises the following elements:
- One or more WLAN infrastructures, i.e. two WLAN infrastructures 20 and 30 in the exemplary embodiment illustrated in FIG. 1. A WLAN infrastructure provides an Application Programming Interface (API) for application editors or IT administrators to populate a directory of applications made available in the WLAN infrastructure.
- One or more communication terminals suitable for establishing a wireless connection with the WLAN infrastructures, i.e. the communication terminal 10 in the exemplary embodiment illustrated in FIG. 1.
- One or more application servers configured to deliver the application data, e.g. downloadable software, through the WLAN infrastructures, i.e. the application server 41 in the exemplary embodiment illustrated in FIG. 1.
- One or more management stations configured to populate the directories of applications in the WLAN infrastructures through the corresponding APIs, i.e. the management station 42 in the exemplary embodiment illustrated in FIG. 1.

The WLAN infrastructures, application servers and management stations are interconnected through any combination of wired or wireless IP networks 40 that may include the Internet, a wide area network, a mobile telephone network, an Ethernet LAN, etc.

The communication terminal 10 may include, but is not limited to, an electronic device in the form of a mobile telephone, a combination personal digital assistant (PDA) and mobile phone, an integrated messaging device, a desktop computer, a netbook computer, a tablet computer, etc. The same general description applies to management station 42.

Figure 4:
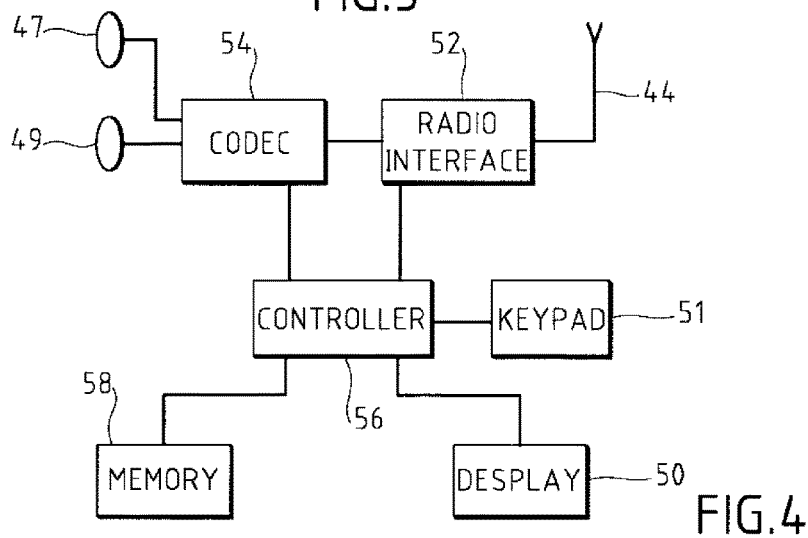
FIG. 4 is a schematic representation of the circuitry of a communication terminal which may be employed in the system of FIG. 1.

FIG. 4 shows one representative electronic device suitable for implementing the communication terminal 10. The electronic device of FIG. 4 includes a housing (not shown), a display 50 in the form of a liquid crystal display, a keypad 51 which may be implemented in a touch screen, a microphone 49, an ear-piece 47, a battery (not shown), an antenna 44, radio interface circuitry 52, codec circuitry 54, a controller 56 and a memory 58. Individual circuits and elements are all of a type well known in the art.

Communication terminal 10 may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, Worldwide Interoperability for Microwave Access (WiMax), LTE, etc. A communication terminal involved in implementing various embodiments of the present invention may communicate using various media including, but not limited to, radio, infrared, laser, cable connection, and the like.

A WLAN infrastructure consists of at least one wireless Access Points (AP), i.e. APs 21 and 31 in the exemplary embodiment illustrated in FIG. 1, and a data storage device for storing a directory of services available in the WLAN infrastructure, i.e. directories 22 and 32 in the exemplary embodiment illustrated in FIG. 1. In a non-illustrated embodiment, a WLAN infrastructure comprises a plurality of APs interconnected through an aggregation network, e.g. Ethernet LAN. The data storage device may be provided in an AP or as a separate device connected to the AP and may include any kind of computer-readable medium, e.g. removable or non-removable, such as a hard drive, Read-only memory (ROM), Random access memory (RAM), optical disc, etc.

The operations of the communication system illustrated in FIG. 1 will be best understood with the following illustrative use-case.

We assume that there are two separate WLAN infrastructures 20 and 30 advertising different applications in a same geographical area, e. g. a building such as a railway station. More precisely, WLAN infrastructure 20 advertises two applications identified by their respective identifiers app_Id1 and app_Id2 and short descriptions. Similarly WLAN infrastructure 30 advertises two applications identified by their respective identifiers app_Id1 and app_Id3 and short descriptions.

The description of the application app_Id1 may be "Get the train arrivals time in the railway station". The description of the application app_Id2 may be "Call for free within railway station area".

In addition, each WLAN infrastructure broadcasts an identifier so that it can be identified by communication terminals, e.g. the Extended Service Set Identification (ES-SID) according to IEEE 802.11 specifications. More precisely, WLAN infrastructure 20 advertises "WiFi1" and WLAN infrastructure 30 advertises "WiFi2" as the ESSID.

In this context, the following scenario can be implemented. A user in possession of communication terminal 10, e.g. a mobile phone, is located in a railway station and wants to get the train arrival times in this station. This railway station hosts two WLAN infrastructures 20 and 30. When under the coverage of WLAN infrastructures 20 and 30, the communication terminal 10 will detect and notify the user that applications app_Id1, app_Id2 and app_Id3 are available for use with their corresponding descriptions such as for instance "Get the train arrival times in the railway station" for app_Id1. The communication terminal 10 will provide a selection interface for the end user to select the desired application and desired WLAN infrastructure, i.e. application app_id1 in the present case and e.g. WiFi1. Then, the communication terminal 10 starts the association procedure with WLAN infrastructure 20 and gets the information from WLAN infrastructure 20 that the application app_Id1 is a web application available at a certain URL, e.g. "https://trains.citystation.eu/arrivals". Once connected to WLAN infrastructure 20, the WLAN communication module of communication terminal 10 requests the mobile operating system (OS) to launch the embedded web browser and navigate to the URL received during the association procedure. Since the communication terminal 10 already indicated that it wanted to use the application app_Id1 at the time of requesting association to the WLAN infrastructure 20, the WLAN infrastructure 20, when receiving the web request from the communication terminal 10 will grant access to the corresponding resource by reverse-proxy-ing the web request towards the web server mapped to the above-mentioned URL.

Figure 2:
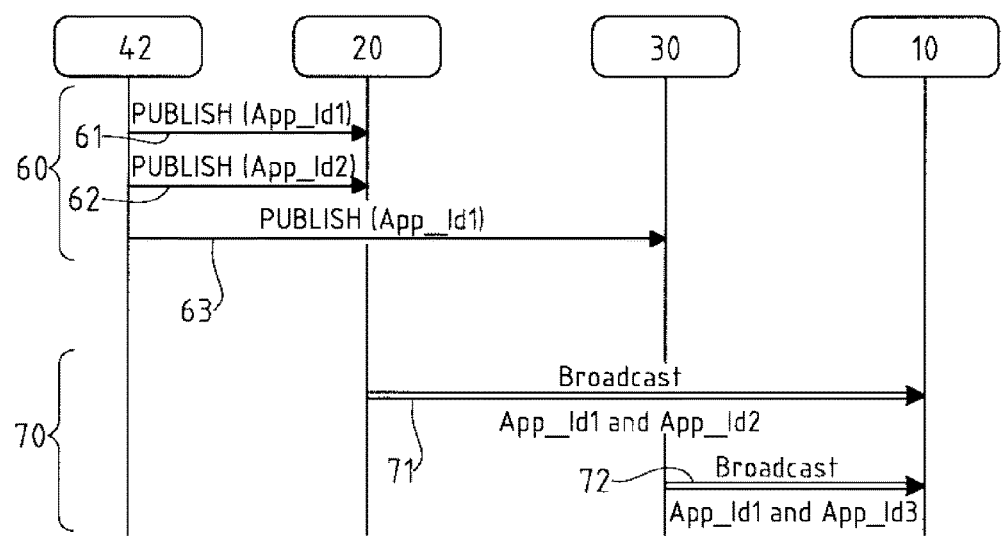
FIG. 2 is a flow chart of a method for publishing service offers in a WLAN infrastructure.
Figure 3:
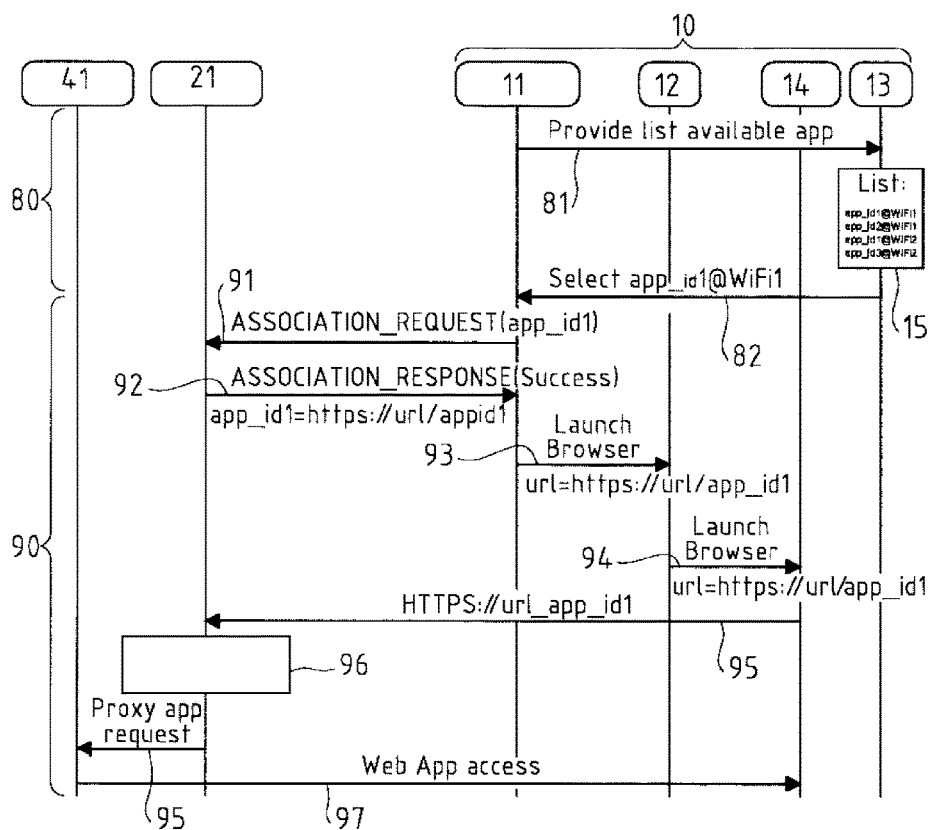
FIG. 3 is a flow chart of a method for accessing an application layer service through a WLAN infrastructure.

This scenario is depicted in more details in the flow charts of FIGS. 2 and 3. These flow charts will be described in four main sequences of method steps.

Application Publication (Sequence 60)

A publishing API is offered by each WLAN infrastructure 20 and 30. This API is used by application editors to publish and register their applications onto the WLAN infrastructure, e.g. from the management station 42 into the service directories 22 and 32 in the exemplary embodiment illustrated in FIG. 2. The publishing API may also be manually accessed by a network administrator configuring the WLAN infrastructure with a network configuration tool. The publishing API allows the editor to specify at least a short description of the application to be registered and a network address or Uniform Resource Locator (URL) from which the application code may be obtained. A unique identifier of the application must also be specified at the time of generating the service record in the directory of available services. Such identifier may be generated manually by the editor or automatically by the WLAN infrastructure.

In further embodiments, the service record may include further characteristics. For example, the publishing API enables to describe the application with the following parameters (or some of them):

Name of the application
Version
Short description in plain text of the services offered by the application
OS supporting the application
Link to download the software application code or launch the web application
Signature from the editor authenticated by a trusted authority
Quality (QoS) requirements to obtain a good behavior of the application
Cost FIG. 2 shows the steps of populating a service directory 22 stored in WLAN infrastructure 20 with service records relating to applications App_Id1 (step 61) and App_id2 (step 62) and populating a directory of services 32 stored in WLAN infrastructure 30 with a service records relating to application App_Id1 (step 63).

As an illustration, the service record generated at step 61 may have the following content:

| | |
|---|---|
| Identifier | app_Id1 |
| Name | Trains Schedule |
| Description | Get train arrival times in the railway station "station_name" |
| Type | Web application |
| QoS requirement | Best Effort |
| URL | //url/appid1 |

As an illustration, the service record generated at step 62 may have the following content:

| | |
|---|---|
| Identifier | app_Id2 |
| Name | OTC Android Smartphone for SXB |
| Description | Call for free within railway station area |
| Type | Android |
| QoS requirement | Voice |
| URL | //url/appid2 |

Information Broadcasting (Sequence 70)

Within a WLAN infrastructure, the or each AP retrieves the content of the directory of services and employs an extended beacon signal to broadcast a service advertisement for each application made available in the WLAN infrastructure. The service advertisement broadcasted comprises at least a unique identifier of each application and a plain text description to give useful information for the end user willing to select the most adequate application.

The service advertisements relating to applications made available in the WLAN infrastructure may be broadcasted using any suitable channel. The service advertisements may be carried in beacon frames or probe response frames. In an IEEE 802.11-compliant infrastructure (i.e. WiFi), the beacon frames include a Vendor Specific field which may be employed for carrying the service advertisements.

FIG. 2 represents Access Point 21 broadcasting service advertisements 71 for applications App_id1 and App_id2 in its coverage area and Access Point 31 broadcasting service advertisements 72 for applications App_id1 and App_id3 in its coverage area.

Service advertisements 71 may comprise further information about the application. The information structure of the service advertisements 71 in WLAN infrastructure 20 may be represented by the JavaScript Object Notation (JSON) format depicted in Appendix 1.

Application Selection (Sequence 80)

When present in the shared coverage area of WLAN infrastructures 20 and 30, the communication terminal 10 will receive the service advertisements from both infrastructures, even before any network connection is established at IP layer. The communication terminal 10 extracts the service advertisements from the beacon frames and provides a service selection interface adapted for the end-user to learn about the available applications and select one or more of them that the end-user intends to launch.

The service selection interface can be a graphical user interface (GUI), text based user interface, voice user interface, mixed-mode interface, and the like. Functionality expressed within the service selection interface can be present within file menus, context menus, menu bars, toolbars, audio-description and the like. The service selection interface can include one or more graphical user interface elements including, but not limited to, checkboxes, radio dialogs, combo boxes, and the like. The service selection interface can receive input and/or selection via traditional and/or proprietary mechanisms, including, keyboard, mouse, gesture, voice, and the like.

An illustrative GUI generated by communication terminal 10 receiving service advertisements 71 and 72 is a window showing this:

| Application | WiFi network | Description |
| --- | --- | --- |
| Train Schedule | WiFi1 | Get train arrivals time in railway station |
| OTC Android Smartphone | WiFi1 | Call for free within railway station area |
| Train Schedule | WiFi2 | Get train arrivals time in railway station |
| Taxi Booker | WiFi2 | Book a taxi in 2 seconds |

Namely, the communication terminal 10 displays to the end-user a list of available WiFi networks and a list of available applications in each WiFi network.

Figure 5:
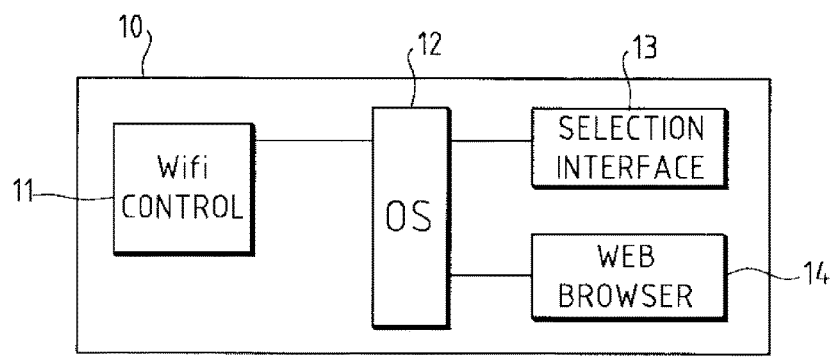
FIG. 5 is a functional representation of a communication terminal which may be employed in the system of FIG. 1.

FIG. 5 is a schematic diagram illustrating functional modules implemented in the communication terminal 10. WLAN control module 11 manages communications with WLAN infrastructures, processing of beacons frames and WLAN association procedures. Service selection module 13 generates and manages the service selection interface. Web browser module 14 offers web navigation functionality in a known manner. Operating System module 12 offers basic processing functions such as memory access, CPU allocation and the like.

FIG. 3 represents WLAN control module 11 providing information 81 extracted from the service advertisements, e.g. a list of applications to service selection module 13 and service selection module 13 generating a GUI 15 displaying the list of applications. Upon receiving an input from the end-user, service selection module 13 returns the identity 82 of the selected application and selected infrastructure to the WLAN control module 11. Selection of the infrastructure may be implicit in some cases, e.g. if a single infrastructure offers the selected application. Selection of the application and/or infrastructure may be performed by the service selection module 13 based on stored user-preference parameters in an embodiment.

In an embodiment, the service selection module 13 can filter the services available for selection as a function of information carried in the service advertisements. For example, the service selection module 13 can restrict the list of available applications as a function of the "Type" to offer only those supported by the OS platform of communication terminal 10.

Application Launching (Sequence 90)

Functionality for launching the selected application is shared between the WLAN infrastructure 20 and the communication terminal 10.

The WLAN association mechanism employed enables the WLAN client to specify to the WLAN infrastructure which application the end-user wants to launch after obtaining network connectivity. The WLAN infrastructure will also use this association mechanism to provide the WLAN client some information necessary to launch the application. As part of the Application launching step, the WLAN infrastructure may also provide some authentication and authorization procedures to grant access to the application depending on the user.

IEEE 802.11 standards require any WLAN client to associate to an AP prior to obtaining IP connectivity with the network. The association step enables to exchange WLAN connection capability and get access to the WLAN infrastructure. Messages employed in such association step can serve to carry additional parameters, e.g. in a vendor specific part of the WiFi messages or in dedicated fields, in order to trigger processes relating to the desired application at the same time, e.g. downloading and execution.

FIG. 3 represents communication terminal 10 sending an Association Request message 91 to AP 21, with the identifier of the selected application App-id1 embedded in the Association Request message 91. When receiving Association Request message 91, the WLAN infrastructure 20 will answer with an Association Response message, preferably after some authorization steps intended to check that this end-user is allowed to get access to this application.

FIG. 3 represents AP 21 sending an Association Response message 92 to communication terminal 10, with the URL retrieved from the directory of services, i.e. URL of web server since App_id1 is a web-application. Service advertisements 71 and/or Association Response message 92 may comprise further information about the application.

Upon receiving Association Response message 92, communication terminal 10 associates to the WLAN AP 21 and extracts the URL of the web server. Since the selected application is tagged as a Web Application, communication terminal 10 also launches a web-browser targeting this URL as the open web page or web resource.

FIG. 3 represents WLAN control module 11 receiving Association Response message 92 and requesting (step 93) the OS module 12 to launch the web browser targeting the URL "//url/appid1" and the OS module 12 sending activation commands (94) to web browser module 14 accordingly.

When the WLAN infrastructure 20 receives an HTTP request 95 corresponding to this URL, it may perform some authentication method to check if the client originating the request, namely communication device 10, is allowed to access the web page. In an embodiment, AP 21 compares an identifier of the client originating the HTTP request 95 (e.g. MAC Address, IP address of client) to previously cached identifiers representing the clients associated to the WLAN infrastructure 20 and which indicated that they wanted to access the selected application, i.e. App_id1. Such comparison makes it possible to deny access when the request comes from a source address that was not previously known, i.e. cached or registered.

If authentication is successful or disabled, the WLAN infrastructure 20 will forward the request to the Web Page. In an embodiment, the URL given in the Association Response message 92 is a local address valid only in the WLAN infrastructure 20 and associated to a public address, e.g. FQDN, of the web server registered in the service directory. In other words, the WLAN infrastructure 20 can operate as a Web proxy.

FIG. 3 represents AP 21 receiving the HTTP request 95, performing an authentication step 96 and reverse-proxying the HTTP request 95 to the application server 41, which is a web server in the present example. From that point, the web browser of the communication device 10 gets connected to the requested web page in a conventional manner, as shown by arrow 97.

The above-described operations for launching the application are slightly modified in the case of a software application that requires some prior configuration steps prior to execution, i.e. downloading and installation. In such case, after the communication terminal 10 gets the URL to the application server during the association step, it silently starts downloading the software application code from the application server, from an application store or directly from the WLAN infrastructure which could act as a mirror. Then, WLAN control module 11 will request the OS module 12 to install and launch the software application.

Figure 6:
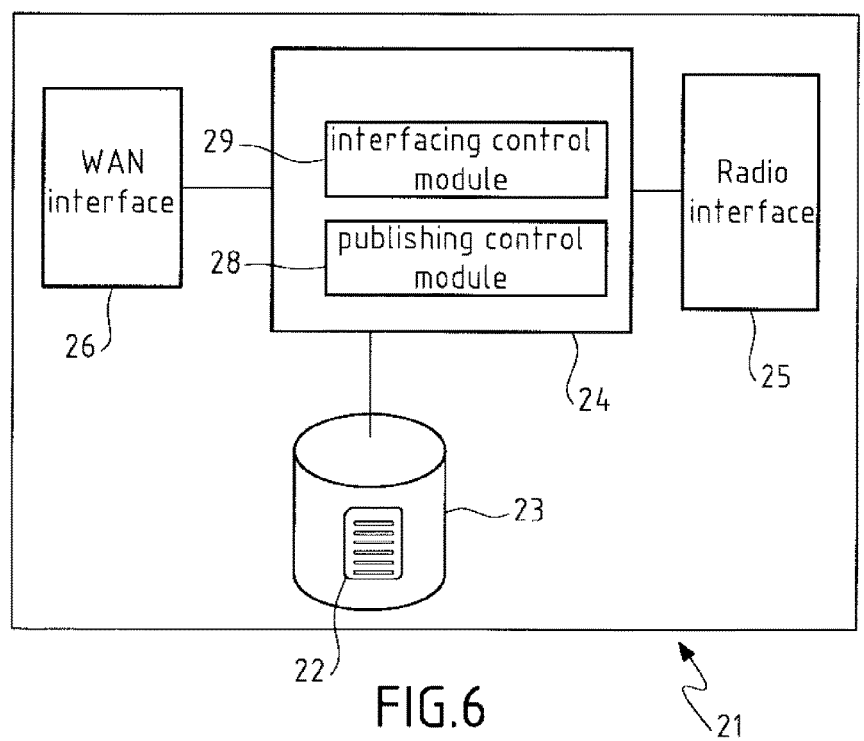
FIG. 6 is a functional representation of a WLAN access point which may be employed in the system of FIG. 1.

FIG. 6 is a schematic diagram illustrating functional modules implemented in the access point 21. Radio interface 25 interfaces the AP 21 with WLAN clients through radiofrequency channels. WAN interface 26 interfaces the AP 21 with IP networks 40 through wired or wireless channels. Control module 24 controls all data processing and communication tasks in the AP 21. In particular, publishing control module 28 interacts with data storage 23 in both write-mode and read-mode to populate service directory 22 stored therein with service records received in the Application publication step and retrieve information from the service records in the information broadcasting step 70 and Application launching step 90. Interfacing control module 29 manages communication between WLAN clients connected through radio interface 25 and distant systems connected through WAN interface 26, including functions such as association, authentication and proxying.

The methods described hereinabove may be executed through the use of dedicated hardware as well as hardware capable of executing software in association with appropriate software. When provided by a processor, the corresponding functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

The invention is not limited to the described embodiments. The appended claims are to be construed as embodying all modification and alternative constructions that may be occurred to one skilled in the art, which fairly fall within the basic teaching here, set forth.

The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps.

In the claims, any reference signs placed between parentheses shall not be construed as limiting the scope of the claims.

[0089] Appendix 1: JavaScript Object Notation (JSON) suitable for service advertisements in WLAN infrastructure 20

```
{"applications":
    {
            "appId":"app_Id1",
        "name":"Sxb Trains Schedule",
"description":"Get train arrivals time in railway station",
            "type":"WebApp",
            "QoS":"Best Effort"
    },
    {
            "appId":"app_Id2",
        "name":"OTC Android Smartphone for SXB",
"description":"Call for free within railway station area",
            "type":"Android",
            "QoS":"Voice"
    }
            }
```

The invention claimed is:

1. A wireless access system comprising:
   a radio interface;
   a data repository storing a directory of available services comprising a set of service records, wherein each service record comprises a service identifier and a network address of an application server suitable for delivering application data corresponding to a computer-implemented service;
   a control module configured to:
     parse an association request received through the radio interface to detect a service identifier carried in the association request;
     look up the directory of available services for retrieving a service record matching the detected service identifier;
     generate and send an association response to a source of the association request through the radio interface, wherein the association response comprises a link to the network address found in the matching service record; and
     provide network connectivity between the source of the association request and the application server associated to the network address,
   wherein:
     each service record further comprises a service descriptor for describing the service to an end-user, and
     the control module is further configured to broadcast beacon signals through the radio interface, wherein:
       the beacon signals comprise a service advertisement for a service record of the directory of available services, and
       the service advertisement comprises the service identifier and the service descriptor found in the service record.

2. The wireless access system of claim 1, wherein the radio interface is configured to send and receive radio signals in accordance with an IEEE 802.11 specification, wherein the association request, association response and beacon signals are configured in accordance with the IEEE 802.11 specification.

3. The wireless access system of claim 2, wherein the beacon signal comprises the service advertisement in a Vendor Specific field of the beacon signal.

4. The wireless access system of claim 1, wherein the service record further comprises at least one of a traffic requirement of the computer-implemented service, a Quality-of-Service requirement of the computer-implemented service, an operating-system requirement of the computer-implemented service, a version number of the computer-implemented service, a security level of the computer-implemented service and a price of the computer-implemented service; and wherein the service advertisement further comprises at least one of the traffic requirement, Quality-of-Service requirement, operating-system requirement, version number, security level and price found in the service record.

5. The wireless access system of claim 1, wherein the control module is further configured to:
   record a source IP address and source MAC address found in the association request; and
   filter out a subsequent data packet received through the radio interface and intended to the network address of the application server in response to detecting that the data packet does not originate from the recorded source IP address and source MAC address.

6. The wireless access system of claim 1, wherein the link to the network address found in the matching service record points to a local address in the wireless access system, wherein the control module is further configured to operate as a reverse-proxy between the application server and the source of the association request.

7. The wireless access system of claim 1, wherein the application data comprises software application code encoding a web application downloadable and executable by a web browser.

8. The wireless access system of claim 1, wherein the application data comprises software application code encoding a software application downloadable and executable by a computer operating system.

* * * * *